(12) United States Patent
Song et al.

(10) Patent No.: US 9,011,713 B2
(45) Date of Patent: Apr. 21, 2015

(54) COMPOSITE, METHOD OF MANUFACTURING THE COMPOSITE, ANODE ACTIVE MATERIAL INCLUDING THE COMPOSITE, ANODE INCLUDING THE ANODE ACTIVE MATERIAL, AND LITHIUM SECONDARY BATTERY INCLUDING THE ANODE

(75) Inventors: Min-sang Song, Seongnam-si (KR); Kyu-sung Park, Suwon-si (KR); Gue-sung Kim, Yongin-si (KR); Young-min Choi, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 176 days.

(21) Appl. No.: 13/419,557

(22) Filed: Mar. 14, 2012

(65) Prior Publication Data

US 2013/0009091 A1 Jan. 10, 2013

(30) Foreign Application Priority Data

Jul. 5, 2011 (KR) ........................ 10-2011-0066444

(51) Int. Cl.
| | | |
|---|---|---|
| *H01M 4/485* | (2010.01) | |
| *H01M 4/04* | (2006.01) | |
| *C01G 23/00* | (2006.01) | |
| *H01M 4/131* | (2010.01) | |
| *H01M 4/1391* | (2010.01) | |
| *H01M 4/48* | (2010.01) | |
| *C01G 29/00* | (2006.01) | |
| *H01M 4/36* | (2006.01) | |
| *H01M 10/0525* | (2010.01) | |
| *H01M 4/02* | (2006.01) | |

(52) U.S. Cl.
CPC ........... *H01M 4/0471* (2013.01); *C01G 23/005* (2013.01); *H01M 4/131* (2013.01); *H01M 4/1391* (2013.01); *H01M 4/483* (2013.01); *H01M 4/485* (2013.01); *H01M 10/0525* (2013.01); *H01M 2004/027* (2013.01); *C01G 29/006* (2013.01); *C01P 2002/52* (2013.01); *C01P 2006/40* (2013.01); *H01M 4/364* (2013.01); *Y02E 60/122* (2013.01)

(58) Field of Classification Search
USPC ......................................... 429/520
See application file for complete search history.

(56) References Cited

U.S. PATENT DOCUMENTS

| | | | |
|---|---|---|---|
| 6,124,057 A * | 9/2000 | Ito et al. ................... | 429/213 |
| 6,827,921 B1 | 12/2004 | Singhal et al. | |
| 2003/0073001 A1* | 4/2003 | Barker et al. ............. | 429/231.1 |

(Continued)

FOREIGN PATENT DOCUMENTS

| | | |
|---|---|---|
| CN | 101222046 A | 7/2008 |
| JP | 08-264179 A | 10/1996 |

(Continued)

OTHER PUBLICATIONS

European Extended Search Report dated Oct. 2, 2012.

*Primary Examiner* — Harold Pyon
*Assistant Examiner* — Katie L Hammer
(74) *Attorney, Agent, or Firm* — Lee & Morse, P.C.

(57) ABSTRACT

Provided are a composite including a lithium titanium oxide and a bismuth titanium oxide, a method of manufacturing the composite, an anode active material including the composite, an anode including the anode active material, and a lithium secondary battery having improved cell performance by including the anode.

22 Claims, 4 Drawing Sheets

(56) References Cited

U.S. PATENT DOCUMENTS

2010/0046143 A1* 2/2010 Yoshio et al. ................ 361/502
2010/0151331 A1   6/2010 Sun et al.
2011/0111295 A1* 5/2011 Yamada ....................... 429/217

FOREIGN PATENT DOCUMENTS

| | | |
|---|---|---|
| JP | 2004-199909 A | 7/2004 |
| WO | WO 10-040285 A1 | 4/2010 |

\* cited by examiner

COMPOSITE, METHOD OF MANUFACTURING THE COMPOSITE, ANODE ACTIVE MATERIAL INCLUDING THE COMPOSITE, ANODE INCLUDING THE ANODE ACTIVE MATERIAL, AND LITHIUM SECONDARY BATTERY INCLUDING THE ANODE

BACKGROUND

1. Field

The present disclosure relates to a composite, a method of manufacturing the composite, an anode active material including the composite, an anode including the anode active material, and a lithium secondary battery including the anode.

2. Description of the Related Art

Lithium secondary batteries that are in the spotlight as power sources of the latest small portable electronic devices exhibit high energy densities because the lithium secondary batteries, which use organic electrolytes, have discharge voltages that are twice or more higher than those of typical batteries using alkaline aqueous solutions.

A lithium secondary battery uses materials capable of having lithium ions inserted therein and extracted therefrom as an anode and a cathode, and is prepared by charging an organic electrolyte or a polymer electrolyte between the cathode and the anode. The lithium secondary battery generates electrical energy via oxidation and reduction reactions in which lithium ions are inserted into and extracted from the cathode and the anode, respectively.

Graphite, high capacity silicon-based transition metal oxides, and tin-based transition metal oxides may be used as anode active materials of lithium secondary batteries. However, there is much room for improvement because high-rate discharge and lifetime characteristics of anode active materials developed so far have not reached satisfactory levels.

SUMMARY

Provided are a composite and a method of manufacturing the same. Provided are also an anode active material including the composite, an anode including the anode active material, and a lithium secondary battery having improved cell performance by including the anode.

Additional aspects will be set forth in part in the description which follows and, in part, will be apparent from the description, or may be learned by practice of the presented embodiments.

An aspect of example embodiments provides a composite, including a lithium titanium oxide and a bismuth titanium oxide.

An interplanar spacing of (111) planes of the lithium titanium oxide may be in a range of about 4.810 Å to about 4.900 Å.

The lithium titanium oxide may be expressed by $Li_{4+a}Ti_{5-b}M_cO_{12-d}$, wherein $-0.2 \leq a \leq 0.2$, $-0.3 \leq b \leq 0.3$, $0 \leq c \leq 0.3$, $-0.3 \leq d \leq 0.3$, and M is at least one of groups 1 to 6 metals, a group 8 metal, and groups 12 to 15 metals.

M may be at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

The bismuth titanium oxide may be expressed by $Bi_{2+e}Ti_{2-f}M'_gO_{7-h}$, wherein $-0.2 \leq e \leq 0.2$, $-0.3 \leq f \leq 0.3$, $0 \leq g \leq 0.3$, $-0.3 \leq h \leq 0.3$, and M' is at least one of groups 1 to 6 metals, a group 8 metal, and groups 12 to 15 metals.

M' may be at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

An atomic ratio of bismuth to titanium in the composite may be in a range of about 0.004 to about 0.2.

A content of the lithium titanium oxide in the composite may be in a range of about 1 mol to about 99 mol, based on 1 mol of the bismuth titanium oxide.

The lithium titanium oxide may be $Li_4Ti_5O_{12}$.

The bismuth titanium oxide may be $Bi_2Ti_2O_7$.

An aspect of example embodiments also provides a method of manufacturing a composite, the method including mechanically mixing a lithium salt, a titanium precursor, and a bismuth salt at the same time to form a mixture, and heat treating the mixture to form a composite including a lithium titanium oxide and a bismuth titanium oxide.

The mixing step may include using the titanium precursor at a content of about 0.9 mol to about 1.3 mol, based on 1 mol of the lithium salt.

An anode active material may include the composite of lithium titanium oxide and bismuth titanium oxide.

The bismuth titanium oxide in the composite may be configured to contribute high-rate characteristics to the anode active material.

An anode comprising the composite of lithium titanium oxide and bismuth titanium oxide.

An aspect of example embodiments also provides a lithium secondary battery, including an anode having a composite of a lithium titanium oxide and a bismuth titanium oxide.

BRIEF DESCRIPTION OF THE DRAWINGS

Features will become apparent to those of ordinary skill in the art by describing in detail exemplary embodiments with reference to the attached drawings in which.

DETAILED DESCRIPTION

Korean Patent Application No. 10-2011-0066444, filed on Jul. 5, 2011, in the Korean Intellectual Property Office, and entitled: "Composite, Method of Manufacturing the Composite, Anode Active Material Including the Composite, Anode Including the Anode Active Material, and Lithium Secondary Battery Including the Anode," is incorporated by reference herein in its entirety.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. It will also be understood that when a layer (or element) is referred to as being "on" another layer or substrate, it can be directly on the other layer or substrate, or intervening layers may also be present. In addition, it will also be understood that when a layer is referred to as being "between" two layers, it can be the only layer between the two layers, or one or more intervening layers may also be present. Like reference numerals refer to like elements throughout.

According to example embodiments, a composite may include a lithium titanium oxide and a bismuth titanium oxide, e.g., the composited may consist essentially of the lithium titanium oxide and bismuth titanium oxide. The composite of lithium titanium oxide and bismuth titanium oxide may be used as an anode active material to form an anode of a secondary lithium battery with improved performance.

In detail, the lithium titanium oxide (LTO) in the composite is a compound expressed by the following Formula 1.

$$Li_{4+a}Ti_{5-b}M_cO_{12-d}$$ [Formula 1]

In Formula 1, $(-0.2) \le a \le 0.2$, $(-0.3) \le b \le 0.3$, $0 \le c \le 0.3$, $(-0.3) \le d \le 0.3$, and M is a metal or metalloid, i.e., at least one of groups 1 to 6 metals, group 8 metal, and groups 12 to 15 metals. For example, M in Formula 1 may be, e.g., at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As. In another example, Formula 1 may not include M, i.e., c=0. For example, the lithium titanium oxide compound may be $Li_4Ti_5O_{12}$.

The bismuth titanium oxide (BTO) in the composite is a compound expressed by the following Formula 2.

$$Bi_{2+e}Ti_{2-f}M'_gO_{7-h}$$ [Formula 2]

In Formula 2, $(-0.2) \le e \le 0.2$, $(-0.3) \le f \le 0.3$, $0 \le g \le 0.3$, $(-0.3) \le h \le 0.3$, and M' is a metal or metalloid, i.e., at least one of groups 1 to 6 metals, group 8 metal, and groups 12 to 15 metals. For example, M' in Formula 2 may be, e.g., at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As. In another example, Formula 2 may not include M', i.e., g=0. For example, the bismuth titanium oxide compound may be $Bi_2Ti_2O_7$.

As discussed previously, the compound expressed by Formula 1 has a spinel-type structure, e.g., the compound expressed by Formula 1 may be $Li_4Ti_5O_{12}$. The compound expressed by Formula 2 may be, e.g., $Bi_2Ti_2O_7$.

In the composite, a mol content of the lithium titanium oxide may be equal to or larger than that of the bismuth titanium oxide. That is, a content of the lithium titanium oxide may be in a range of about 1 mol to about 99 mol, based on 1 mol of the bismuth titanium oxide. For example, the content may be in a range of about 1.63 mol to about 99 mol, e.g., about 1.63 mol, about 3.55 mol, about 10.11 mol, about 19 mol, or about 99 mol, based on 1 mol of the bismuth titanium oxide. When the content of the lithium titanium oxide is in the foregoing ranges, high-rate characteristics, e.g., high-rate discharge and high-rate lifetime characteristics, of the composite may be provided.

In the composite, an atomic ratio x/y of bismuth (Bi) to titanium (Ti), where x is an atomic percent of Bi and y is an atomic percent of Ti, is in a range of about 0.004 to about 0.2, e.g., in a range of about 0.015 to about 0.025. The atomic ratio may be determined according to inductively coupled plasma (ICP) analysis.

An interplanar spacing of (111) planes of the bismuth titanium oxide constituting the composite is in a range of about 4.810 Å to about 4.900 Å. For example, the interplanar spacing may be in a range of about 4.811 Å to about 4.820 Å, e.g., about 4.811 Å, about 4.813 Å, about 4.817 Å, about 4.819 Å, or about 4.820 Å. When the interplanar spacing of (111) planes of the bismuth titanium oxide is in the foregoing ranges, the high-rate characteristics of the composite may be excellent.

The interplanar spacing of (111) planes of the bismuth titanium oxide may be obtained through X-ray diffraction analysis using a CuK-α characteristic X-ray wavelength of 1.541 Å. A peak corresponding to the (111) planes of the bismuth titanium oxide appears at a Bragg 2θ angle of about 20±2°, e.g., at a Bragg 2θ angle of about 18.4°. The interplanar spacing of (111) planes of the bismuth titanium oxide is calculated according to the following Equation 1 by using peak characteristics, such as that a 2θ value of a major peak, i.e., a peak having the strongest intensity, of the lithium titanium oxide is about 18.4°, from X-ray diffraction analysis using a CuK-α characteristic X-ray wavelength of 1.541 Å.

$$\lambda = 2d \sin \theta$$ [Equation 1]

In Equation 1, λ denotes a X-ray wavelength of 1.5405 Å, d denotes an interplanar spacing, and θ denotes "θ" of Bragg 2θ.

From X-ray diffraction analysis on the composite, major peaks related to the lithium titanium oxide are observed at 2θ ranges of about 18° to about 19°, about 35° to about 36.5°, and about 42° to about 44°. Major peaks related to the bismuth titanium oxide are observed at 2θ ranges of about 29.5° to about 30.5°, about 34.5° to about 35.5°, and about 49.5° to about 50.5°.

Hereinafter, a method of manufacturing a composite according to an embodiment is described.

A lithium salt, a titanium precursor, and a bismuth salt may be mixed at the same time, i.e., simultaneously, and mechanical mixing may be performed thereon. A target composite may be obtained through the mechanical mixing of the lithium salt, the titanium precursor, and the bismuth salt at the same time.

A mixing ratio between the lithium salt, the titanium precursor, and the bismuth salt may be appropriately controlled in order to obtain the lithium titanium oxide of Formula 1 and the bismuth titanium oxide of Formula 2. For example, a content of the bismuth salt used may be in a range of about 0.005 mol to about 0.5 mol based on 1 mol of the lithium salt, and a content of the titanium precursor used may be in a range of about 0.9 mol to about 1.3 mol based on 1 mol of the lithium salt.

The mechanical mixing may be performed by using, e.g., a ball mill, a Banbury mixer, or a homogenizer. For example, the mechanical mixing may be performed for about 20 minutes to about 10 hours, e.g., about 30 minutes to about 3 hours, but the treatment time is not limited thereto. During the mechanical mixing, mixing efficiency may be increased by adding an alcohol solvent, e.g., ethanol.

Subsequently, a resultant mixture containing the lithium salt, the titanium precursor, and the bismuth salt may be heat treated in air or oxygen atmosphere at a temperature of about 400° C. to about 1000° C., e.g., at about 650° C. to about 900° C. The heat treatment may be performed for about 3 hours to about 7 hours, but the heat treatment time is not limited thereto. When the heat treatment time and temperature are in the foregoing ranges, a composite having excellent high-rate discharge and lifetime characteristics may be obtained.

Examples of the lithium salt may include lithium carbonate ($Li_2CO_3$), lithium sulfate ($Li_2SO_4$), lithium nitrate ($LiNO_3$), and lithium hydroxide (LiOH). Examples of the bismuth salt may include bismuth nitrate, bismuth hydroxide, etc.

Examples of the titanium precursor may be titanium oxide ($TiO_2$) and titanium hydroxide ($Ti(OH)_4$). When the titanium oxide is used as the titanium precursor, titanium oxide particles having an average particle diameter within a range of about 20 nm to about 25 nm are used, but the average particle diameter of the titanium oxide is not particularly limited.

For example, the composite may be used as an anode active material. An average diameter, i.e., thickness, of the composite obtained according to the foregoing processes may be, e.g., in a range of about 500 nm to about 5000 nm.

Further, the anode active material including the composite may be used to form an anode according to example embodiments. The anode may include a binder in addition to the foregoing anode active material.

The binder is a component assisting in bonding of an active material and a conductive agent and bonding with respect to a current collector, and may be added in a range of about 1 part by weight to about 50 parts by weight, e.g., a content of the binder may be in a range of about 2 parts by weight to about 5 parts by weight, based on 100 parts by weight of the anode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, a styrene-butadiene rubber, a fluoro rubber, various copolymers, etc. When the content of the binder is in the foregoing range, binding force of an active material layer with respect to a current collector may be relatively good.

The conductive agent in the anode may be any suitable material with electrical conductivity that does not cause chemical changes to the present battery. A content of the conductive agent may be, e.g., in a range of about 0.01 parts by weight to about 5 parts by weight, e.g., about 0.5 parts by weight to about 2 parts by weight, based on 100 parts by weight of the composite, i.e., the anode active material. When the content of the conductive agent is in the foregoing range, electrical conductivity characteristics of the resultant anode may be excellent.

Examples of the conductive agent may include at least one of a carbon-based conductive agent, e.g., carbon black, carbon fibers, and/or graphite, conductive fibers, e.g., metal fibers, a metal powder, e.g., fluorocarbon powder, an aluminum powder, and a nickel powder, conductive whiskers, e.g., zinc oxide whiskers and potassium titanate whiskers, a conductive metal oxide, e.g., titanium oxide, and a polyphenylene derivative. If the conductive agent includes a carbon based conductive agent, the carbon black may include, e.g., acetylene black, Ketjen black, Super P, channel black, furnace black, lamp black, and/or thermal black, and the graphite may include, e.g., natural graphite or artificial graphite.

A lithium secondary battery according to an embodiment may include the foregoing anode. The lithium secondary battery may exhibit excellent high-rate discharge and lifetime characteristics. The phrase "high-rate discharge characteristics" denotes a ratio of actually discharged capacity when a cell in a 100% charged state is discharged at a current by which cell capacity is fully discharged within a time less than a predetermined time (e.g., less than 10 hours) to actually discharged capacity when the cell in a 100% charged state is discharged at a current by which the cell capacity is fully discharged in the predetermined time (e.g., about 10 hours).

For example, the anode may be manufactured by the following method.

First, a composite including the lithium titanium oxide and the lithium bismuth oxide according to an embodiment, a binder, and a solvent may be mixed to prepare a composition for forming an anode active material layer. One or more conductive agents may be selectively added to the composition for forming an anode active material layer. An anode active material generally used in the art that is capable of storing and releasing, e.g., a carbon-based material such as graphite or carbon, a lithium metal, a lithium alloy, and a silicon oxide-based material ions, may be additionally included during the preparation of the composition for forming an anode active material. Subsequently, the anode is manufactured by coating and drying the composition for forming an anode active material layer on an anode current collector.

The anode current collector is generally prepared having a thickness within a range of about 3 μm to about 500 μm. The anode current collector may be formed of any suitable material, as long as it has electrical conductivity and does not cause chemical changes to the present battery. Examples of a material for the anode current collector may include copper, stainless steel, aluminum, nickel, titanium, heat treated carbon, copper, or stainless steel surface treated with carbon, nickel, titanium, or silver, an aluminum-cadmium alloy, etc. Also, a binding force with respect to the anode active material may be reinforced by forming microscopic irregularities on a surface of the anode current collector. The anode current collector may be used in various forms, e.g., a film, a sheet, a foil, a net, a porous body, a foam, a nonwoven fabric, etc.

N-methylpyrrolidone (NMP), acetone, water, or a mixture thereof may be used as the solvent. A content of the solvent may be about 1 part by weight to about 50 parts by weight, based on 100 parts by weight of the anode active material. When the content of the solvent is in the foregoing range, a process of forming an active material layer is facilitated.

A method of manufacturing the lithium secondary battery is described below. In addition to the foregoing anode, a cathode is manufactured according to the following processes.

The cathode may be manufactured by coating and drying a composition for forming a cathode active material layer on a current collector, similar to the manufacturing processes of the foregoing anode. The composition for forming a cathode active material layer is prepared by mixing a cathode active material, a conductive agent, a binder, and a solvent.

A lithium transition metal oxide generally used as a cathode active material in a lithium battery may be used as the cathode active material. Types and contents of the conductive agent, the binder, and the solvent are the same as those used during the manufacturing of the anode. Examples of the lithium transition metal oxide may include $LiCoO_2$, $LiNiO_2$, $LiMnO_2$, $LiMn_2O_4$, $Li(Ni_aCo_bMn_c)O_2$ (where $0<a<1$, $0<b<1$, $0<c<1$, $a+b+c=1$), $LiNi_{1-Y}Co_YO_2$, $LiCo_{1-Y}Mn_YO_2$, $LiNi_{1-Y}Mn_YO_2$ (where $0 \le Y<1$), $LiMn_{2-z}Ni_zO_4$, $LiMn_{2-z}Co_zO_4$ (where $0<z<2$), $LiCoPO_4$, and $LiFePO_4$.

The cathode current collector may have a thickness of about 3 μm to about 500 μm, and may include any suitable material as long as it has high electrical conductivity and does not cause chemical changes to the present battery. Examples of materials for the cathode current collector may include stainless steel, aluminum, nickel, titanium, heat treated carbon, or stainless steel surface treated with carbon, nickel, titanium, or silver, etc. Adhesion with respect to the cathode active material may be reinforced by forming microscopic irregularities on a surface of the cathode current collector. The cathode current collector may be used in various forms such as a film, a sheet, a foil, a net, a porous body, a foam, a nonwoven fabric, etc.

A separator may be disposed between the cathode and the anode obtained according to the foregoing processes, and a lithium secondary battery may be manufactured by providing an organic electrolyte thereto.

For example, the anode, the separator, and the cathode may be sequentially stacked, winded or folded, and then put in a cylindrical or prismatic battery case or a pouch, and then the foregoing lithium secondary battery may be manufactured by injecting an organic electrolyte into the battery case or the pouch.

A pore diameter and a thickness of the separator may be in a range of about 0.01 μm to about 10 μm, e.g., about 5 μm to about 300 μm, respectively. Particular examples of the separator may be an olefin-based polymer, e.g., polypropylene or polyethylene, a sheet or nonwoven fabric made of glass fibers, etc.

The organic electrolyte may be an organic solvent in which a lithium salt is dissolved. Examples of the organic solvent may include propylene carbonate, ethylene carbonate, fluoroethylene carbonate, butylene carbonate, dimethyl carbonate, diethyl carbonate, methylpropyl carbonate, ethylpropyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethyl sulfoxide, dioxane, 1,2-dimethoxyethane, sulfolane, dichloroethane, chlorobenzene, nitrobenzene, diethylene glycol, dimethyl ether, and a combination thereof.

The lithium salt may include, e.g., at least one of $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (where x and y are natural numbers), LiCl, LiI, and a combination thereof.

A lithium secondary battery according to another embodiment may use an organic solid electrolyte and/or an inorganic solid electrolyte together in addition to the separator. When the organic solid electrolyte and/or the inorganic solid electrolyte are used, the foregoing separator may not be used because the solid electrolyte may perform the function of the separator in some cases.

Examples of the organic solid electrolyte may include a polyethylene derivative, a polyethylene oxide derivative, a polypropylene oxide derivative, a phosphate ester polymer, polyester sulfide, polyvinyl alcohol, polyvinylidene fluoride, etc. Examples of the inorganic solid electrolyte may be nitrides, halides, and sulfates of Li such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, and $Li_3PO_4$—$Li_2S$—$SiS_2$.

Figure 1:
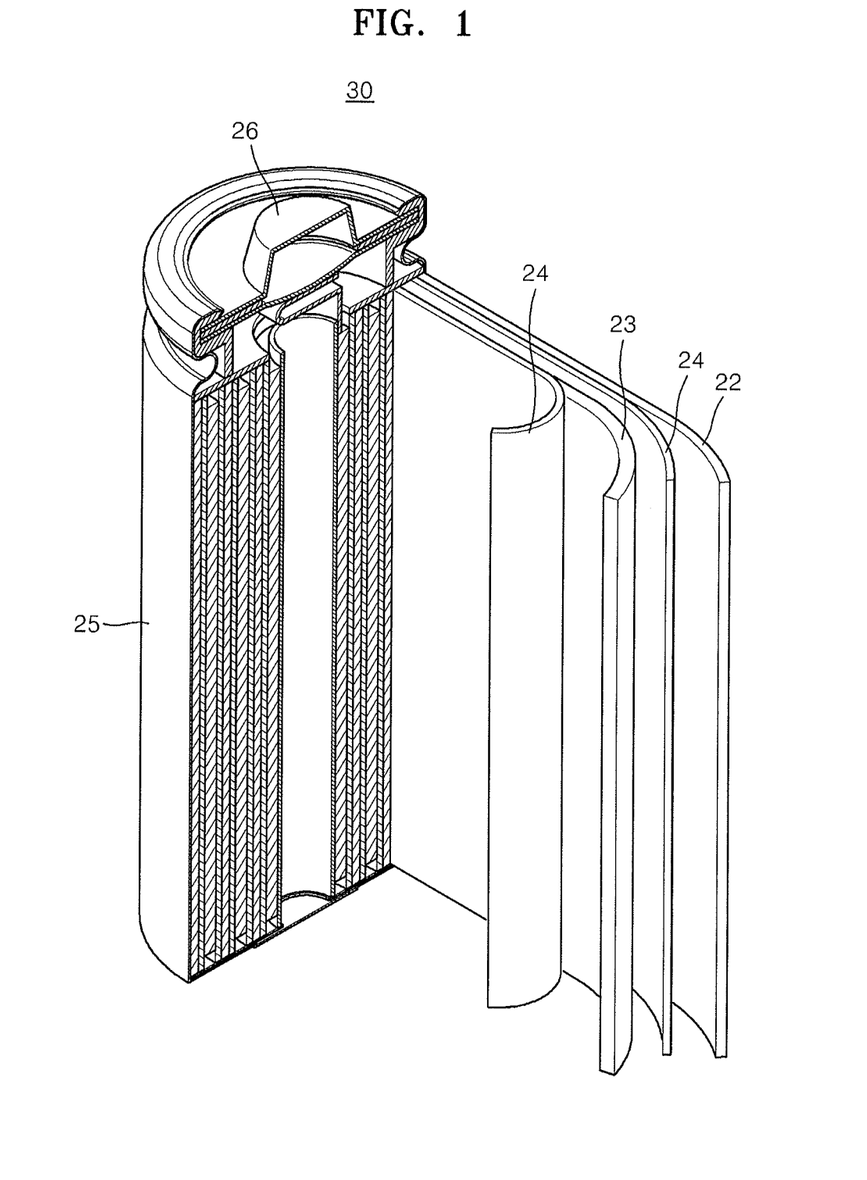
FIG. 1 illustrates a schematic structure of a lithium secondary battery according to an embodiment.

FIG. 1 schematically illustrates a structure of a lithium secondary battery according to an embodiment.

Referring to FIG. 1, a lithium secondary battery 30 may include a cathode 23, an anode 22, a separator 24 disposed between the cathode 23 and the anode 22, an electrolyte (not shown) impregnated in the cathode 23, the anode 22, and the separator 24, a battery case 25, and a sealing member 26 for sealing the battery case 25, as main elements. The cathode 23, the anode 22 and the separator 24 may be sequentially stacked, and then wound in a spiral shape. The lithium secondary battery 30 may be formed by containing the spiral-shaped wound stack in the battery case 25.

EXAMPLES

Hereinafter, example embodiments are described in more detail with reference to examples. However, the following examples only exemplify the embodiments, and the present invention is embodiments are not limited thereto.

Manufacturing Example 1

Manufacturing of a Composite

About 1.2876 g of $Li_2CO_3$, about 1.7321 g of $TiO_2$, and about 0.0423 g of $Bi(NO_3)_3 \cdot 5H_2O$ were mixed at the same time via mechanical mixing for about 30 minutes by using a ball mill. The resultant mixture was heat treated at about 850° C. in air for about 5 hours to manufacture a $Li_4Ti_5O_{12}/Bi_2Ti_2O_7$ composite having a molar ratio ($x(Li_4Ti_5O_{12})/y(Bi_2Ti_2O_7)$) of about 0.99:0.01 (x:y).

Manufacturing Example 2

Manufacturing of Composite

About 1.2876 g of $Li_2CO_3$, about 1.7049 g of $TiO_2$, and about 0.2113 g of $Bi(NO_3)_3 \cdot 5H_2O$ were mixed under the same conditions, as described previously with reference to the Manufacturing Example 1. The resultant composite $Li_4Ti_5O_{12}/Bi_2Ti_2O_7$ had a molar ratio of about 0.95:0.05.

Manufacturing Example 3

Manufacturing of Composite

About 1.2876 g of $Li_2CO_3$, about 1.6701 g of $TiO_2$, and about 0.4226 g of $Bi(NO_3)_3 \cdot 5H_2O$ were mixed under the same conditions, as described previously with reference to the Manufacturing Example 1. The resultant composite $Li_4Ti_5O_{12}/Bi_2Ti_2O_7$ had a molar ratio of about 0.91:0.09.

Manufacturing Example 4

Manufacturing of Composite

About 1.2876 g of $Li_2CO_3$, about 1.5657 g of $TiO_2$, and about 1.0566 g of $Bi(NO_3)_3 \cdot 5H_2O$ were mixed under the same conditions, as described previously with reference to the Manufacturing Example 1. The resultant composite $Li_4Ti_5O_{12}/Bi_2Ti_2O_7$ composite had a molar ratio of about 0.78:0.22.

Manufacturing Example 5

Manufacturing of Composite

About 1.2876 g of $Li_2CO_3$, about 1.3917 g of $TiO_2$, and about 2.1132 g of $Bi(NO_3)_3 \cdot 5H_2O$ were mixed under the same conditions, as described previously with reference to the Manufacturing Example 1. The resultant composite $Li_4Ti_5O_{12}/Bi_2Ti_2O_7$ had a molar ratio of about 0.62:0.38.

Comparative Manufacturing Example 1

Manufacturing of $Li_4Ti_5O_{12}$

About 1.2876 g of $Li_2CO_3$ and about 1.7397 g of $TiO_2$ were mixed for about 30 minutes. $Li_4Ti_5O_{12}$ was manufactured by heat treating the mixture at about 850° C. in air atmosphere for about 5 hours.

Comparative Manufacturing Example 2

Manufacturing of Anode Active Material

About 1 g of $Li_4Ti_5O_{12}$ obtained according to Comparative Manufacturing Example 1 and about 0.2785 g of $Bi(NO_3)_3 \cdot 5H_2O$ were mixed, and then an anode active material was prepared by heat treating the mixture at about 600° C. in air atmosphere.

Figure 2:
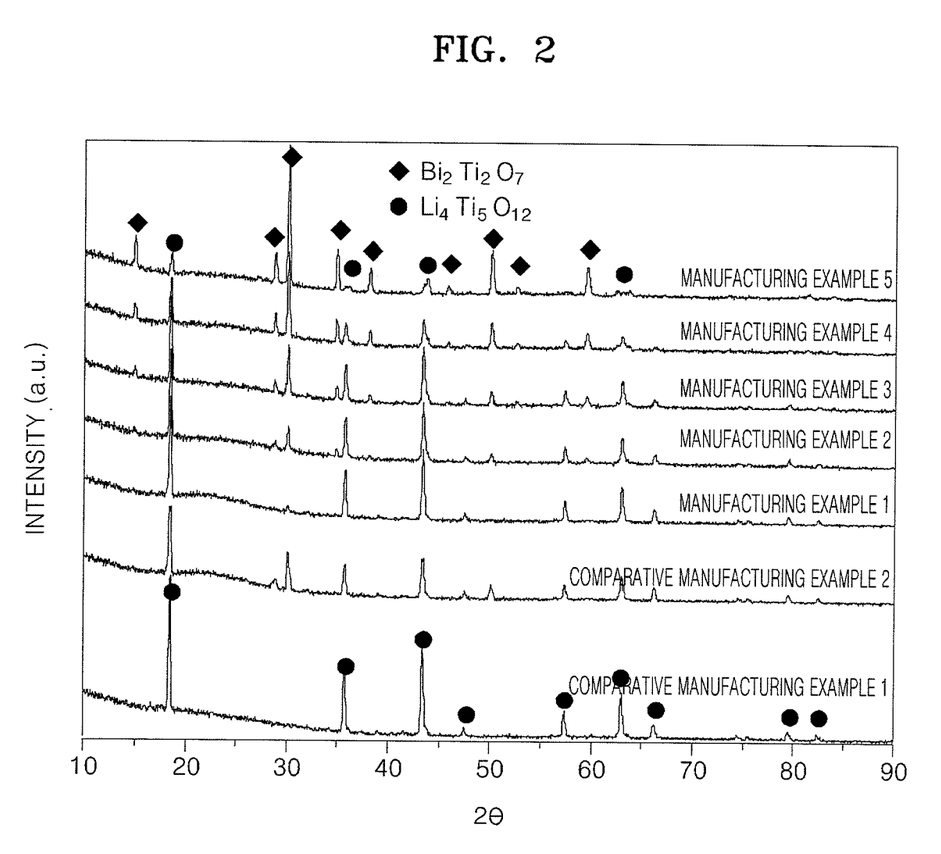
FIG. 2 illustrates results of X-ray diffraction (XRD) analyses on composites according to Manufacturing Examples 1 to 5 and on $Li_4Ti_5O_{12}$ according to Comparative Example 1.

X-ray diffraction (XRD) analyses were performed on the materials manufactured according to Manufacturing Examples 1 to 5 and Comparative Examples 1 and 2. Results are presented in FIG. 2.

With respect to the materials manufactured according to Manufacturing Examples 1 to 5 and Comparative Examples 1 and 2, each interplanar spacing d(111) of (111) planes corresponding to a major peak of LTO, i.e., a 2θ peak occurring at about 18.4°, was investigated among the results of XRD pattern analyses. The results thereof are presented in Table 1 below.

TABLE 1

| Category | d(111) (Å) |
|---|---|
| Manufacturing Example 1 | 4.811 |
| Manufacturing Example 2 | 4.817 |
| Manufacturing Example 3 | 4.813 |
| Manufacturing Example 4 | 4.820 |
| Manufacturing Example 5 | 4.819 |
| Comparative Manufacturing Example 1 | 4.808 |
| Comparative Manufacturing Example 2 | 4.809 |

Referring to Table 1, it may be clearly understood that d(111) values of the composites of Manufacturing Examples 1 to 5 were different from those of the materials of Comparative Manufacturing Examples 1 and 2.

Example 1

Manufacturing of Anode and Coin Half-Cell

Together with N-methylpyrrolidone (NMP), a powder of the composite of Manufacturing Example 1 and polyvinylidene fluoride (PVDF) are mixed in a weight ratio of about 98:2, and then a slurry was prepared by mechanical mixing. The slurry was coated in a thickness of about 90 μm on an aluminum foil, and then an anode was manufactured by vacuum drying at about 120° C.

Thereafter, the anode was formed in a circular shape having a diameter of about 12 mm, and then a 2032-type coil half-cell was manufactured by preparing a lithium metal as a counter electrode. At this time, 1.1 M LiPF$_6$ and 0.2 M LiBF$_6$ solutions dissolved in a solvent, in which ethylene carbonate and methylethyl carbonate were mixed in a volume ratio of about 3:7, were used as an electrolyte.

Examples 2-5

Manufacturing of Anode and Coin Half-Cell

Except for using the composites of Manufacturing Examples 2 to 5 instead of the composite of Manufacturing Example 1, anodes and coin half-cells were manufactured using the method of Example 1.

Comparative Examples 1-2

Manufacturing of Anode and Coin Half-Cell

Except for using the materials according to Comparative Manufacturing Examples 1 and 2 instead of the composite of Manufacturing Example 1, anodes and coin half-cells were manufactured using the method of Example 1.

Evaluation Example

Charge-discharge characteristics of the coin half-cells respectively manufactured in Examples 1 to 5 and Comparative Example 1 or the pouch full cells respectively manufactured in Example 1 and Comparative Example 1 were evaluated with a charge-discharge tester (TOYO, model TOYO-3100).

Evaluation Example 1

Room-Temperature Lifetime Characteristic Evaluation

About 100 charge-discharge cycles were performed on the coin half-cells respectively manufactured in Examples 1 to 5 and Comparative Examples 1 and 2 by charging the coin half-cells at constant current (about 1 C) and constant voltage (about 1.0V, about 0.01 C cut-off), allowing the coin half-cells to rest for about 10 minutes, and then discharging the coin half-cells at constant current (about 1 C, room temperature (about 20° C.), about 2.5V cut-off).

Lifetime characteristics of the respective coin half-cells were evaluated as changes in normalized capacity according to the number of charge-discharge cycles. At this time, the lifetime characteristics are presented in Table 2 and FIG. 3, respectively.

The "normalized capacity" may be calculated according to the following Equation 2. The "normalized capacity" is also referred to as a "capacity retention ratio." Also, "C" in "1 C" of the following Table 2 is a discharge rate of a cell denoting a value obtained by dividing total capacity of the cell by a total discharge time.

Normalized capacity (%)=(discharge capacity when discharging a cell at a predetermined C-rate)/(discharge capacity when discharging the cell at 0.1 C rate)*100  Equation 2

The "1 C Life" in the following Table 2 is calculated by the following Equation 3.

1 C Life (%)=(discharge capacity after performing 100 charge-discharge cycles on a cell at 1 C and room temperature)/(discharge capacity when discharging the cell at 0.1 C rate)*100  Equation 3

TABLE 2

| | 1 C Life (%) |
|---|---|
| Example 1 | 90.9 |
| Example 2 | 100.0 |
| Example 3 | 92.3 |
| Example 4 | 94.4 |
| Example 5 | 92.8 |
| Comparative Example 1 | 81.6 |
| Comparative Example 2 | 83.8 |

Figure 3:
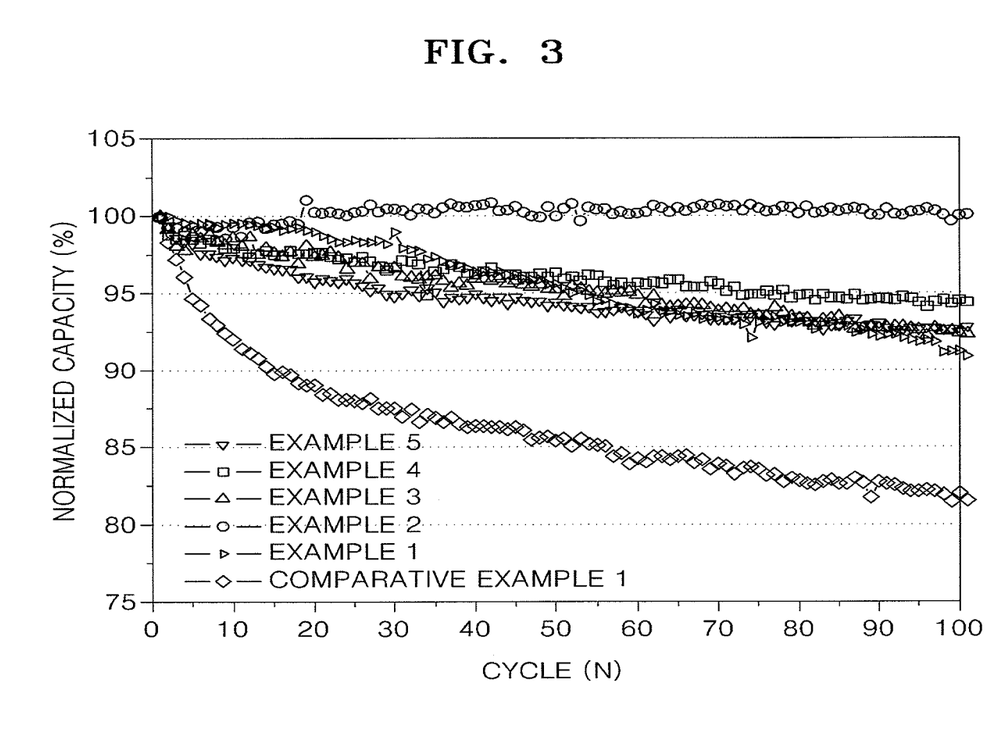
FIG. 3 illustrates a graph showing room-temperature lifetime characteristics of coin half-cells respectively manufactured in Examples 1 to 5 and Comparative Example 1.

Referring to Table 2 and FIG. 3, it may be understood that the coin half-cells of Examples 1 to 5 had improved lifetime characteristics in comparison to that of Comparative Example 1. Herein, the 'improved lifetime characteristics" denotes that a reduction ratio of the normalized capacity (i.e., a capacity retention ratio) according to an increase in the number of charge-discharge cycles became small.

Evaluation Example 2

High-Rate Discharge Characteristic Evaluation

The coin half-cells respectively manufactured in Examples 1 to 5 and Comparative Examples 1 and 2 were charged with a constant current (about 0.1 C) and constant voltage (about 1.0 V, about 0.01 C cut-off), allowed to rest for about 10 minutes, and then discharged to about 2.5 V under a constant current (about 0.1 C, 0.2 C, 0.5 C, 1 C, 2 C, 5 C, or 10 C) condition. That is, high-rate discharge characteristics of the each coin half-cell were evaluated by changing the discharge rate to about 0.1 C, 0.2 C, 0.5 C, 1 C, 2 C, 5 C, or 10 C, respectively. The high-rate discharge characteristics at this time are presented in FIG. 4 and Table 3, respectively.

Figure 4:
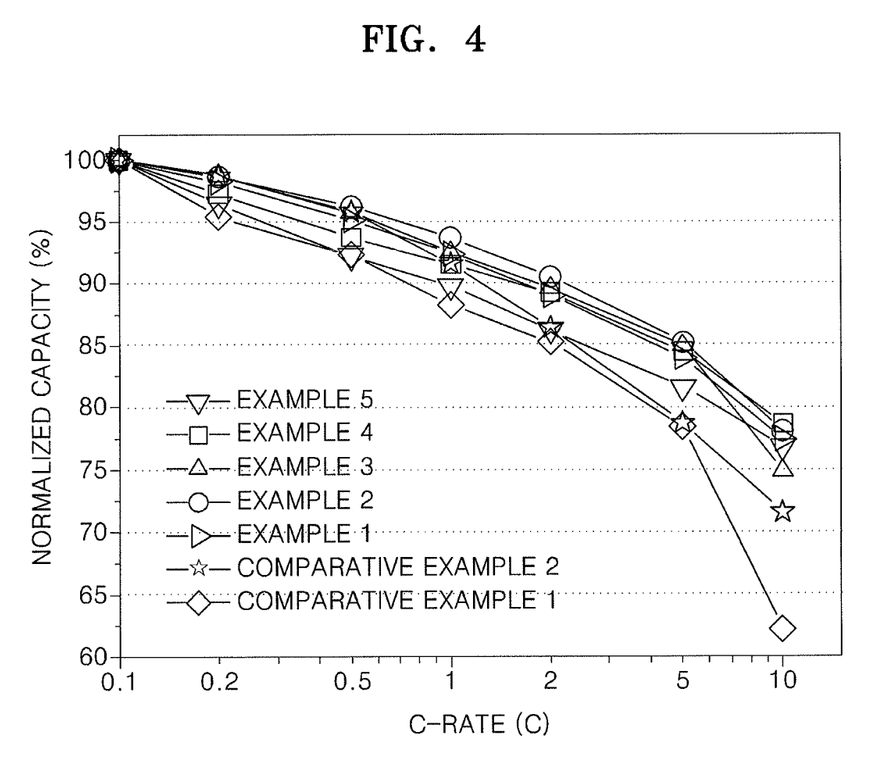
FIG. 4 illustrates a graph showing high-rate discharge characteristics of the coin half-cells respectively manufactured in Examples 1 to 5 and Comparative Example 1.

A "C-rate" in FIG. 4 is a discharge rate of a cell denoting a value obtained by dividing a total capacity of the cell by a total discharge time. The high-rate discharge characteristics in the following Table 3 may be calculated by the following Equation 4.

High-rate discharge characteristics (%)=(discharge capacity when discharging a cell at 10 C)/(discharge capacity when discharging the cell at 0.1 C rate)*100      Equation 4

TABLE 3

| Category | High-Rate Characteristics (10 C/0.1 C) (%) |
|---|---|
| Example 1 | 77.4 |
| Example 2 | 78.1 |
| Example 3 | 74.9 |
| Example 4 | 78.7 |
| Example 5 | 76.8 |
| Comparative Example 1 | 62.2 |
| Comparative Example 2 | 71.6 |

Referring to Table 3 and FIG. 4, the coin half-cells of Examples 1 to 5 had excellent high-rate discharge characteristics in comparison to those of Comparative Examples 1 and 2. Herein, the "excellent high-rate discharge characteristics" denotes that a reduction ratio of the normalized capacity (i.e., the capacity retention ratio) according to an increase in the discharge rate (C-rate) is small.

A composite according to an example embodiment may be easily manufactured, and a lithium secondary battery having excellent room-temperature lifetime characteristics and improved high-rate lifetime and discharge characteristics may be manufactured when the composite is used as an anode active material.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope of the present invention as set forth in the following claims.

What is claimed is:

1. A composite, comprising:
   a lithium titanium oxide; and
   a bismuth titanium oxide, the bismuth titanium oxide being expressed by $Bi_{2+e}Ti_{2-f}M'_gO_{7-h}$, wherein $-0.2 \le e \le 0.2$, $-0.3 \le f \le 0.3$, $0 \le g \le 0.3$, $-0.3 \le h \le 0.3$, and M' is at least one of a groups 1 to 6 metals, a group 8 metal, and a group 12 to 15 metal.

2. The composite as claimed in claim 1, wherein an interplanar spacing of (111) planes of the lithium titanium oxide is in a range of about 4.810 Å to about 4.900 Å.

3. The composite as claimed in claim 1, wherein the lithium titanium oxide is expressed by $Li_{4+a}Ti_{5-b}M_cO_{12-d}$, wherein $-0.2 \le a \le 0.2$, $-0.3 \le b \le 0.3$, $0 \le c \le 0.3$, $-0.3 \le d \le 0.3$, and M is at least one of groups 1 to 6 metals, a group 8 metal, and groups 12 to 15 metals.

4. The composite as claimed in claim 3, wherein M is at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

5. The composite as claimed in claim 1, wherein M' is at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

6. The composite as claimed in claim 1, wherein an atomic ratio of bismuth to titanium in the composite is in a range of about 0.004 to about 0.2.

7. The composite as claimed in claim 1, wherein a content of the lithium titanium oxide in the composite is in a range of about 1 mol to about 99 mol, based on 1 mol of the bismuth titanium oxide.

8. The composite as claimed in claim 1, wherein the lithium titanium oxide is $Li_4Ti_5O_{12}$.

9. The composite as claimed in claim 1, wherein the bismuth titanium oxide is $Bi_2Ti_2O_7$.

10. A method of manufacturing a composite, the method comprising:
    mechanically mixing a lithium salt, a titanium precursor, and a bismuth salt at the same time to form a mixture; and
    heat treating the mixture to form a composite including a lithium titanium oxide and a bismuth titanium oxide, the lithium salt, a titanium precursor, and a bismuth salt being provided such that the bismuth titanium oxide is expressed by $Bi_{2+e}Ti_{2-f}M'_gO_{7-h}$, wherein $-0.2 \le e \le 0.2$, $-0.3 \le f \le 0.3$, $0 \le g \le 0.3$, $-0.3 \le h \le 0.3$, and M' is at least one of a groups 1 to 6 metals, a group 8 metal, and a group 12 to 15 metal.

11. The method as claimed in claim 10, wherein the mixing step includes using the titanium precursor at a content of about 0.9 mol to about 1.3 mol, based on 1 mol of the lithium salt.

12. An anode active material comprising the composite of claim 1.

13. The anode active material as claimed in claim 12, wherein the anode active material exhibits a 1 C Life ranging from 90.9% to 100% and a High-Rate Discharge Characteristic ranging from 74.9% to 78.7%.

14. An anode comprising the composite of claim 1.

15. A lithium secondary battery, comprising:
    an anode including a composite of a lithium titanium oxide and a bismuth titanium oxide, the bismuth titanium oxide being expressed by $Bi_{2+e}Ti_{2-f}M'_gO_{7-h}$, wherein $-0.2 \le e \le 0.2$, $-0.3 \le f \le 0.3$, $0 \le g \le 0.3$, $-0.3 \le h \le 0.3$, and M' is at least one of a groups 1 to 6 metals, a group 8 metal, and a group 12 to 15 metal.

16. The anode active material as claimed in claim 12, wherein an interplanar spacing of (111) planes of the lithium titanium oxide is in a range of 4.810 Å to about 4.900 Å.

17. The anode active material as claimed in claim 12, wherein the lithium titanium oxide is expressed by $Li_{4+a}Ti_{5-b}M_cO_{12-d}$, wherein $-0.2 \le a \le 0.2$, $-0.3 \le b \le 0.3$, $0 \le c \le 0.3$, $-0.3 \le d \le 0.3$, and M is at least one of groups 1 to 6 metals, a group 8 metal, and groups 12 to 15 metals.

18. The anode active material as claimed in claim 17, wherein M is at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

19. The anode active material as claimed in claim 12, wherein M' is at least one of Li, Na, Mg, Al, Ca, Sr, Cr, V, Fe, Co, Ni, Zr, Zn, Si, Y, Nb, Ga, Sn, Mo, W, Ba, La, Ce, Ag, Ta, Hf, Ru, Bi, Sb, and As.

20. The anode active material as claimed in claim 12, wherein an atomic ratio of bismuth to titanium in the composite is in a range of about 0.004 to about 0.2.

21. The anode active material as claimed in claim 12, wherein a content of the lithium titanium oxide in the composite is in a range of about 1 mol to about 99 mol, based on 1 mol of the bismuth titanium oxide.

22. The anode active material as claimed in claim 12, wherein the lithium titanium oxide is $Li_4Ti_5O_{12}$, and the bismuth titanium oxide is $Bi_2Ti_2O_7$.

* * * * *